Patented July 29, 1952

2,605,232

UNITED STATES PATENT OFFICE 2,605,232

PROCESS FOR BREAKING PETROLEUM EMULSIONS

Melvin De Groote, St. Louis, Mo., assignor to Petrolite Corporation, Ltd., Wilmington, Del., a corporation of Delaware No Drawing. Application February 8, 1952, Serial No. 270,767

12 Claims. (Cl. 252—340)

The present application is a continuation-in-part of my copending application Serial No. 179,401, filed August 14, 1950, now abandoned, which was a continuation-in-part and was co-pending with my application for Patent No. 2,552,528, dated May 15, 1951.

This invention relates to petroleum emulsions of the water-in-oil type that are commonly referred to as "cut oil," "roily oil," "emulsified oil," etc., and which comprise fine droplets of naturally-occurring waters or brines dispersed in a more or less permanent state throughout the oil which constitutes the continuous phase of the emulsion.

One object of my invention is to provide a novel process for breaking or resolving emulsions of the kind referred to.

Another object of my invention is to provide an economical and rapid process for separating emulsions which have been prepared under controlled conditions from mineral oil, such as crude oil and relatively soft waters or weak brines. Controlled emulsification and subsequent demulsification under the conditions just mentioned are of significant value in removing impurities, particularly inorganic salts from pipeline oil.

Demulsification as contemplated in the present application includes the preventive step of commingling the demulsifier with the aqueous component which would or might subsequently become either phase of the emulsion, in absence of such precautionary measure. Similarly, such demulsifier may be mixed with the hydrocarbon component.

In my aforementioned Patent No. 2,552,528, I have described a process for breaking petroleum emulsions of the water-in-oil type characterized by subjecting the emulsion to the action of a demulsifier including high molal oxypropylation derivatives of a member of the class consisting of monomeric polyhydric compounds and monomeric polyhydric derivatives thereof which bear a simple genetic relationship thereto, with the proviso that:

(a) The initial polyhydric reactant be free from any radical having at least 8 uninterrupted carbon atoms;

(b) The initial polyhydric reactant having a molecular weight not over 1200 and at least 4 hydroxyl radicals;

(c) The initial polyhydric reactant be water-soluble and xylene-insoluble;

(d) The oxypropylation end product be water-insoluble and xylene-soluble;

(e) The oxypropylation end product be within the molecular weight range of 2,000 to 30,000 on an average statistical basis;

(f) The solubility characteristics of the oxypropylation end product in respect to water and xylene be substantially the result of the oxypropylation step;

(g) The ratio of propylene oxide per hydroxyl in the initial polyhydric reactant be within the range of 7 to 70;

(h) The initial polyhydric reactant represent not more than 12½% by weight of the oxypropylation end product on a statistical basis, and (i) The preceding provisos being based on complete reaction involving the propylene oxide and the initial polyhydric reactant.

Furthermore, in said aforementioned patent I pointed out that such hydroxylated materials obtained by oxypropylation could be reacted with dicarboxy acids such as diglycollic acid to yield valuable derivatives which are satisfactory also for demulsification of petroleum emulsions.

The demulsifying agent employed in the present process is a fractional ester obtained from a polycarboxy acid and a polyhydroxylated compound obtained by the oxypropylation of a polyglycerol or etherized polyglycerol with the proviso that such etherized polyglycerol have at least four hydroxyl radicals and that the ether radical be derived from a monohydroxylated compound, such as an alcohol, phenol, or the like, having less than 8 carbon atoms. Examples include the aliphatic alcohols, alicyclic alcohols such as hexanol and methyl hexanol, phenols such as hydroxy benzene or cresol, benzyl alcohol and its alicyclic analogues, etc. My preference is that the ether group contain at least three carbon atoms and preferably be derived from a water-soluble alcohol such as propyl alcohol, butyl alcohol or amyl alcohol. In the case of butyl or amyl alcohols some of the isomers are water-soluble to the extent that they show solubility of at least a few percent at room temperature. Other alcohols which can be employed include tetrahydropyran-2-methanol and tetrahydrofurfuryl alcohol.

More specifically then the present invention is concerned with a process for breaking petroleum emulsions of the water-in-oil type characterized by subjecting the emulsion to the action of a demusifier including hydropile synthetic products; said hydrophile synthetic products being the acidic fractional esters derived by reaction between (A) a polycarboxy acid and (B) high molal oxypropylation derivatives of polyglycerols and ethers of polyglycerols, with the proviso that:

(a) The initial polyhydric reactant have at least 4 hydroxyl radicals;

(b) The initial polyhydric reactant be free from any radical having at least 8 uninterrupted carbon atoms;

(c) The initial polyhydric reactant be water-soluble;

(d) The oxypropylation end product be water-insoluble;

(e) The oxypropylation end product be within the molecular weight range of 2,000 to 25,000 on an average statistical basis;

(f) The solubility characteristics of the oxypropylation end product in respect to water and organic solvents by substantially the result of the oxypropylation step;

(g) The ratio of propylene oxide per hydroxyl in the original polyhydric reactant be within the range of 7 to 80;

(h) The initial polyglycerol reactant represent not more than 12½% by weight of the oxypropylation end product on a statistical basis, and (i) The preceding provisos being based on complete reaction involving the propylene oxide and the initial polyhydric reactant; and (C) with the final proviso that the reaction ratio of (A) to (B) be one mole of (A) for each hydroxyl radical present in (B).

The preparation of glycerol, particularly diglycerol, is well known. For example, reference is made to the following patents: U. S. Patents Nos. 1,126,467, 2,382,764, 2,477,550, and 2,487,208.

Ethers of polyglycerols can be prepared in any one of a number of ways. For example, the same procedure employed to convert glycerol into an ether can be employed generally to convert a polyglycerol into an ether.

As to patents that illustrate such procedures see U. S. Patents Nos. 1,959,930, 2,089,569, 2,164,007, 2,181,100, 2,221,818, 2,314,039, 2,380,185, 2,453,634, 2,413,860, 2,010,726, and 2,258,892.

See also pamphlet entitled "Epichlorohydrin," issued by Shell Chemical Corporation, New York city, New York.

Since polyglycerol may be acyclic or cyclic it is obvious that formation of rings eliminates hydroxyls and thus if in doubt a compound should be examined in the usual manner to determine that there are at least four hydroxyl radicals present. Generally this involves nothing more than the molecular weight determination and a hydroxyl determination, particularly if the method of manufacture is known.

Other methods of manufacture are obvious; for example, reacting glycerol with one or more moles of glycide. Another procedure involves the reaction of an ether, such as glycerol alpha gamma di-isopropyl ether, with three or more moles of glycide. The same procedure can be employed in connection with glycerol alpha gamma diphenyl ether. Other procedures involve the reaction of glycerol alpha allyl ether, glycerol alpha ethyl ether, glycerol alpha isopropyl ether, glycerol alpha phenyl ether, or the like, with a mole of glycide. Another procedure involves the reaction of diglycerol with a mole of allyl glycidyl ether, glycidyl isopropyl ether, glycidyl phenyl ether, or similar compounds. Needless to say, any one of a number of reactions involve the use of epichlorohydrin or a simple derivative thereof to yield hydroxylated compounds of the kind herein employed as initial raw materials.

Other procedures have been described, or are obvious, in which reactants such as glycerol monochlorohydrin, glycerol dichlorohydrin, and allyloxy-3-chloro-2-propanol, chloro-3-isopropoxy-2-propanol and the like are employed.

Much of what is said hereinafter is concerned with diglycerol for the reason that it can be obtained commercially and is entirely satisfactory for the purpose.

Having obtained the oxypropylated compound of the kind hereinafter described in greater detail, i. e., by treating a polyglycerol or ether thereof with sufficient propylene oxide so as to introduce approximately 7 to 80 moles of propylene oxide per hydroxyl radical, the product so obtained is then converted into an acidic ester by reaction with a polycarboxy acid so as to introduce one mole of the acid for each hydroxyl radical. Such esterification is conducted under comparatively mild conditions so as to prevent polymerization, i. e., the final product is an acidic ester of the initial hydroxylated material and not a polyester.

For convenience, what is said hereinafter will be divided into five sections:

Part 1 is concerned with the preparation of the oxypropylation derivatives of the polyglycerol or polyglycerol ethers of the kind described;

Part 2 is concerned with the preparation of the esters from the oxypropylated derivatives;

Part 3 is concerned with the structure of the polyhydroxylated compounds and particularly after oxypropylation, and its relationship to methods of describing the ultimate demulsifiers;

Part 4 is concerned with the use of the products herein described as demulsifiers for breaking water-in-oil emulsions, and Part 5 is concerned with certain derivatives which can be obtained from the oxypropylated intermediates. In some instances such derivatives are obtained by modest oxyethylation, preceding the oxypropylation step, or by oxypropylation followed by oxyethylation. This results in intermediates having somewhat different properties which can be reacted with the same polycarboxy acids or anhydrides described in Part 2 to give effective demulsifying agents. For this reason a description of the apparatus makes casual mention of oxyethylation. For the same reason there is brief mention of the use of glycide and also in the latter instance this is significant insofar that glycide has been specified as a reactant in this introductory presentation for the preparation of polyglycerols.

PART ONE

For a number of well known reasons equipment, whether laboratory size, semi-pilot plant size, pilot plant size, or large scale size, is not as a rule designed for a particular alkylene oxide. Invariably and inevitably, however, or particularly in the case of laboratory equipment and pilot plant size the design is such as to use any of the customarily available alkylene oxide, i. e., ethylene oxide, propylene oxide, butylene oxide, glycide, epichlorohydrin, styrene oxide, etc. In the subsequent description of the equipment it becomes obvious that it is adapted for oxyethylation as well as oxypropylation.

Oxypropylations are conducted under a wide variety of conditions, not only in regard to presence of absence of catalyst, and the kind of catalyst, but also in regard to the time of reaction, temperature of reaction, speed of reaction, pressure during reaction, etc. For instance, oxyalkylations can be conducted at temperatures up to approximately 200° C. with pressures in about the same range up to about 200 pounds per square inch. They can be conducted also at temperatures approximating the boiling point of water or slightly above, as for example 95° to 120° C. Under such circumstances the pressure will be less than 30 pounds per square inch unless some special procedure is employed as is sometimes the case, to wit, keeping at atmosphere of inert gas such as nitrogen in the vessel during the reaction. Such low-temperature-low reaction rate oxypropylations have been described very completely in U. S. Patent No. 2,448,664 to H. R. Fife et al., dated September 7, 1948. Low temperature, low pressure oxypropylations are particularly desirable where the compound being subjected to oxypropylation contains one, two or three points of reaction only, such as monohydric alcohols, glycols and triols.

The initial reactants in the instant application contain at least 4 hydroxyl groups and for this reason there is possibly less advantage in using low temperature oxypropylation rather than high temperature oxypropylation. However, the reactions do not go too slowly and this particular procedure was used in the subsequent examples.

Since low pressure-low temperature reaction speed oxypropylations require considerable time, for instance, 1 to 7 days of 24 hours each to complete the reaction they are conducted as a rule whether on a laboratory scale, pilot plant scale, or large scale, so as to operate automatically. The prior figure of seven days applies especially to large-scale operations. I have used conventional equipment with two added automatic features: (a) a solenoid controlled valve which shuts off the propylene oxide in event that the temperature gets outside a predetermined and set range, for instance, 95° to 120° C., and (b) another solenoid valve which shuts off the propylene oxide (or for that matter ethylene oxide if it is being used) if the pressure gets beyond a predetermined range, such as 25 to 35 pounds. Otherwise, the equipment is substantially the same as is commonly employed for this purpose where the pressure of reaction is higher, speed of reaction is higher, and time of reaction is much shorter. In such instances such automatic controls are not necessarily used.

Thus, in preparing the various examples I have found it particularly advantageous to use laboratory equipment or pilot plant which is designed to permit continuous oxyalkylation whether it be oxypropylation or oxyethylation. With certain obvious changes the equipment can be used also to permit oxyalkylation involving the use of glycide where no pressure is involved except the vapor pressure of a solvent, if any, which may have been used as a diluent.

As previously pointed out the method of using propylene oxide is the same as ethylene oxide. This point is emphasized only for the reason that the apparatus is so designed and constructed as to use either oxide.

The oxypropylation procedure employed in the preparation of the oxyalkylated derivatives has been uniformly the same, particularly in light of the fact that a continuous automatically-controlled procedure was employed. In this procedure the autoclave was a conventional autoclave made of stainless steel and having a capacity of approximately 15 gallons and a working pressure of one thousand pounds gauge pressure. This pressure obviously is far beyond any requirement as far as propylene oxide goes unless there is a reaction of explosive violence involved due to accident. The autoclave was equipped with the conventional devices and openings, such as the variable-speed stirrer operating at speeds from 50 R. P. M. to 500 R. P. M.; thermometer well and thermocouple for mechanical thermometer; emptying outlet; pressure gauge, manual vent line; charge hole for initial reactants; at least one connection for introducing the alkylene oxide, such as propylene oxide or ethylene oxide, to the bottom of the autoclave; along with suitable devices for both cooling and heating the autoclave, such as a cooling jacket, and, preferably, coils in addition thereto, with the jacket so arranged that it is suitable for heating with steam or cooling with water and further equipped with electrical heating devices. Such autoclaves are, of course, in essence small-scale replicas of the usual conventional autoclave used in oxyalkylation procedures. In some instances in exploratory preparations an autoclave having a smaller capacity, for instance, approximately 3½ liters in one case and about 1¾ gallons in another case, was used.

Continuous operation, or substantially continuous operation, was achieved by the use of a separate container to hold the alkylene oxide being employed, particularly propylene oxide. In conjunction with the smaller autoclaves, the container consists essentially of a laboratory bomb having a capacity of about one-half gallon, or somewhat in excess thereof. In some instances a large bomb was used, to wit, one having a capacity of about one gallon. This bomb was equipped, also, with an inlet for charging, and an eductor tube going to the bottom of the container so as to permit discharging of alkylene oxide in the liquid phase to the autoclave. A bomb having a capacity of about 60 pounds was used in connection with the 15-gallon autoclave. Other conventional equipment consists, of course, of the rupture disc, pressure gauge, sight feed glass, thermometer, connection for nitrogen for pressuring bomb, etc. The bomb was placed on a scale during use. The connections between the bomb and the autoclave were flexible stainless steel hose or tubing so that continuous weighings could be made without breaking or making any connections. This applies also to the nitrogen line, which was used to pressure the bomb reservoir. To the extent that it was required, any other usual conventional procedure or addition which provided greater safety was used, of course, such as safety glass protective screens, etc.

Attention is directed again to what has been said previously in regard to automatic controls which shut off the propylene oxide in event temperature of reaction passes out of the predetermined range or if pressure in the autoclave passes out of predetermined range.

With this particular arrangement practically all oxypropylations become uniform in that the reaction temperature was held within a few degrees of any selected point, for instance, if 105° C. was selected as the operating temperature the maximum point would be at the most 110° C. or 112° C., and the lower point would be 95° or possibly 98° C. Similarly, the pressure was held at approximately 30 pounds within a 5-pound variation one way or the other, but might drop to practically zero, especially where no solvent such as xylene is employed. The speed of reaction was comparatively slow under such conditions as compared with oxyalkylations at 200° C. Numerous reactions were conducted in which the time varied from one day (24 hours) up to three days (72 hours), for completion of the final member of a series. In some instances the reaction may take place in considerably less time, i. e., 24 hours or less, as far as a partial oxypropylation is concerned. The minimum time recorded was about a 6-hour period in a single step. Reactions indicated as being complete in 7 or 8 hours may have been complete in a lesser period of time in light of the automatic equipment employed. In the addition of propylene oxide, in the autoclave equipment as far as possible the valves were set so all the proylene oxide if fed continuously would be added at a rate so that the predetermined amount would react within the first 5 hours of the 8-hour period or two-thirds of any shorter period. This meant that if the reaction was interrupted automatically for a period of time for pressure to drop or temperature to drop the predetermined amount of oxide would still be added in most instances well within the predetermined time period. Sometimes where the addition was a comparatively small amount in an 8-hour period there would be an unquestionable speeding up of the reaction, by simply repeating the example and using 4, 5 or 6 hours instead of 8 hours.

When operating at a comparatively high temperature, for instance, between 150° to 200° C., an unreacted alkylene oxide such as propylene oxide, makes its presence felt in the increase in pressure or the consistency of a high pressure. However, at a low enough temperature it may happen that the propylene oxide goes in as a liquid. If so, and if it remains unreacted there is, of course, an inherent danger and appropriate steps must be taken to safeguard against this possibility; if need be a sample must be withdrawn and examined for unreacted propylene oxide. One obvious procedure, of course, is to oxypropylate at a modestly higher temperature, for instance, at 140° to 150° C. Unreacted oxide affects determination of the acetyl or hydroxyl value of the hydroxylated compound obtained.

The higher the molecular weight of the compound, i. e., towards the latter stages of reaction, the longer the time required to add a given amount of oxide. One possible explanation is that the molecule, being larger, the opportunity for random reaction is decreased. Inversely, the lower the molecular weight the faster the reaction takes place. For this reason, sometimes at least, increasing the concentration of the catalyst does not appreciably speed up the reaction, particularly when the product subjected to oxyalkylation has a comparatively high molecular weight. However, as has been pointed out previously, operating at a low pressure and a low temperature even in large scale operations as much as a week or ten days time may lapse to obtain some of the higher molecular weight derivatives from monohydric or dihydric materials.

In a number of operations the counterbalance scale or dial scale holding the propylene oxide bomb was so set that when the predetermined amount of propylene oxide had passed into the reaction the scale movement through a time operating device was set for either one to two hours so that reaction continued for 1 to 3 hours after the final addition of the last propylene oxide and thereafter the operation was shut down. This particular device is particularly suitable for use on larger equipment than laboratory size autoclaves, to wit, on semi-pilot plant or pilot plant size, as well as on large scale size. This final stirring period is intended to avoid the presence of unreacted oxide.

In this sort of operation, of course, the temperature range was controlled automatically by either use of cooling water, steam, or electrical heat, so as to raise or lower the temperature. The pressuring of the propylene oxide into the reaction vessel was also automatic insofar that the feed stream was set for a slow continuous run which was shut off in case the pressure passed a predetermined point as previously set out. All the points of design, construction, etc., were conventional including the gases, check valves and entire equipment. As far as I am aware at least two firms, and possibly three, specialize in autoclave equipment such as I have employed in the laboratory, and are prepared to furnish equipment of this same kind. Similarly pilot plant equipment is available. This point is simply made as a precaution in the direction of safety. Oxyalkylations, particularly involving ethylene oxide, glycide, propylene oxide, etc., should not be conducted except in equipment specifically designed for the purpose.

*Example 1a*

The particular autoclave employed was one with a capacity of approximately 15 gallons, or on the average of about 120 pounds of reaction mass. The speed of the stirrer could be varied from 150 to 340 R. P. M. Slightly over 6½ pounds of a commercial diglycerol of high purity were charged into the autoclave along with a little over .6 pound caustic soda. The reaction pot was flushed out with nitrogen, the autoclave was sealed, and the automatic devices adjusted and set for injecting a total of almost 62 pounds of propylene oxide in a 9-hour period. The pressure regulator was set for a maximum of 35 pounds per square inch. However, in this particular step and in all the succeeding steps the pressure never got over 30 pounds per square inch. In fact, this meant that the bulk of the reaction could take place and did take place at an appreciably lower pressure. This comparatively low pressure was the result of the fact that considerable catalyst was present, the propylene oxide was added comparatively slowly and, more important, the selected temperature range was 205° to 215° F. (about the boiling point of water). The initial introduction of the propylene oxide was not started until the hearing devices had raised the temperature to approximately the boiling point of water. At the completion of the reaction a sample was taken and oxypropylation proceeded as in Example 2a, immediately succeeding.

*Example 2a*

45 pounds of the reaction mass identified as Example 1a were permitted to remain in the reaction vessel and without the addition of any more catalyst approximately 16 pounds more of propylene oxide were added. The oxypropylation was conducted in substantially the same manner in regard to pressure and temperature as in Example 1a, preceding, except that the reaction was completed in six hours. At the end of the reaction period part of the sample was withdrawn and oxypropylation was continued as described in Example 3a, following.

*Example 3a*

Approximately 52¾ pounds of the reaction mass identified as Example 2a, preceding, were permitted to stay in the reaction vessel. About 26¾ pounds of propylene oxide were introduced during this period. No additional catalyst was added. The conditions of reaction as far as temperature and pressure were concerned were substantially the same as in Example 1a, preceding. The reaction time was 7 hours. At the completion of the reaction, part of the reaction mass was withdrawn and the remainder subjected to oxypropylation as described in Example 4a, succeeding.

as described in Example 1a, as far as temperature and pressure were concerned. The time required for the addition of this oxide was 8 hours.

What has been said herein is presented in tabular form in Table 1 immediately following, with some added information as to molecular weight and as to solubility of the reaction product in water, xylene and kerosene.

TABLE 1

| Ex. No. | Composition Before | | | Composition at End | | | | M. W. by Hyd. Determin. | Max. Temp., °F. | Max. Pres., lbs. sq. in. | Time, Hrs. |
|---|---|---|---|---|---|---|---|---|---|---|---|
| | H. C.[1] Amt., Lbs. | Oxide Amt., Lbs. | Catalyst, Lbs. | Theo. Mol. Wt. | H. C.[1] Amt., Lbs. | Oxide Amt., Lbs. | Catalyst, Lbs. | | | | |
| 1a | 6.56 | | 0.62 | 1,745 | 6.56 | 61.83 | .62 | 1,453 | 205–215 | 30 | 8½ |
| 2a | 4.28 | 40.32 | .40 | 2,345 | 4.28 | 56.32 | .40 | 1,745 | 205–215 | 30 | 6 |
| 3a | 3.71 | 48.70 | .34 | 3,540 | 3.71 | 75.45 | .34 | 2,630 | 205–215 | 30 | 7 |
| 4a | 2.67 | 54.08 | .25 | 4,485 | 2.67 | 69.58 | .25 | 2,810 | 205–215 | 30 | 6 |
| 5a | 2.32 | 61.84 | .22 | 6,585 | 2.32 | 89.46 | .22 | 3,550 | 205–215 | 30 | 6 |
| 6a | 1.68 | 64.66 | .16 | 7,765 | 1.68 | 73.91 | .16 | 3,760 | 205–215 | 30 | 5.5 |
| 7a | 1.52 | 66.6 | .13 | 9,665 | 1.52 | 87.1 | .13 | 3,910 | 205–215 | 30 | 7 |
| 8a | 1.08 | 61.83 | .09 | 10,900 | 1.08 | 70.83 | .09 | 4,275 | 205–215 | 30 | 8 |

[1] The hydroxylated compound is acyclic diglycerol.

Example 4a 57 pounds of the reaction mass were permitted to remain in the autoclave. No additional catalyst was introduced. Approximately 15½ pounds of propylene oxide were introduced in the same manner as described in Example 1a, preceding. Conditions in regard to temperature and pressure were substantially the same. In this instance the oxide was introduced in four hours. At the end of the reaction period part of the sample was withdrawn and the remainder of the reaction mass subjected to further oxypropylation as described in Example 5a, following.

Example 5a

Slightly over 64⅓ pounds of reaction mass were permitted to remain in the autoclave. No additional catalyst was introduced. Slightly over 27½ pounds of propylene oxide were introduced in the same manner as described in Example 1a, preceding. The conditions of temperature and pressure were substantially the same. The time required to introduce the oxide was 6 hours.

Example 6a

Approximately 66½ pounds of reaction mass were permitted to stay in the autoclave. No additional catalyst was added. This was subjected to reaction with about 9¼ pounds of propylene oxide. Conditions of reaction were substantially the same as described in Example 1a as far as temperature and pressure were concerned. The period required for addition of the oxide was 5½ hours.

Example 7a

Approximately 68¼ pounds of reaction mass were permitted to stay in the autoclave. Without adding any more catalyst this was subjected to reaction with approximately 20½ pounds of propylene oxide. Conditions of reaction were substantially the same as described in Example 1a as far as temperature and pressure were concerned. The time period required for the addition of this oxide was 7 hours.

Example 8a

Approximately 63 pounds of the reaction mass were permitted to stay in the autoclave. Without adding any more catalyst this was subjected to reaction with 9 pounds of propylene oxide. Conditions of reaction were substantially the same Examples 1a and 2a were soluble in water. Example 3a was not soluble but showed a tendency to emulsify. Example 4a was dispersible in water, i. e., did not emulsify as well as the previous example. Example 5a was largely insoluble in water, but a fraction of the mixture was dispersible. Also, note that Example 5a and all succeeding examples were soluble in kerosene. Examples 1a, 2a and 3a were not soluble in kerosene. Example 4a was dispersible in kerosene. Examples 1a through 8a were all soluble in xylene. In all cases the oxypropylated derivative must be xylene-soluble and is preferably water-insoluble. My preference is to employ derivatives which are kerosene-soluble.

The final product, i. e., at the end of the oxypropylation step, was a somewhat viscous amber-colored fluid which was water-insoluble. This is characteristic of all various end products obtained in this series. These products were, of course, slightly alkaline due to the residual caustic soda employed. This would also be the case if sodium methylate were used as a catalyst.

Speaking of insolubility in water or solubility in kerosene such solubility test can be made simply by shaking small amounts of the materials in a test tube with water, for instance, using 1% to 5% approximately based on the amount of water present.

Needless to say, there is no complete conversion of propylene oxide into the desired hydroxylated compounds. This is indicated by the fact that the theoretical molecular weight based on a statistical average is greater than the molecular weight calculated by usual methods on basis of acetyl or hydroxyl value. Actually, there is no completely satisfactory method for determining molecular weights of these types of compounds with a high degree of accuracy when the molecular weights exceed 2,000. In some instances the acetyl value or hydroxyl value serves as satisfactorily as an index to the molecular weight as any other procedure, subject to the above limitations, and especially in the higher molecular weight range. If any difficulty is encountered in the manufacture of the esters as described in Part 2 the stoichiometrical amount of acid or acid compound should be taken which corresponds to the indicated acetyl or hydroxyl value. This matter has been discussed in the literature and is a matter of common knowledge and requires no further elaboration. In fact, it is illustrated by some of the examples appearing in the patent previously mentioned.

Using a smaller autoclave, i. e., one having a capacity of slightly less than one gallon, I have prepared a number of similar compounds from diglycerol ethers, for example, the product obtained by reacting one mole of diglycerol with one mole of glycidyl isopropyl ether and also with one mole of glycidyl phenyl ether. These ethers were oxypropylated in substantially the same manner and under substantially the same conditions as in Examples 1a through 8a, preceding. For sake of brevity the data are summarized in the following table:

TABLE 2

| Example No. | Reactant | Theoretical Molecular Weight | Molecular Weight by Hydroxyl Determination |
|---|---|---|---|
| 9a | Diglycerol ether obtained by reacting diglycerol with glycidyl isopropyl ether mole for mole. | 1,778 | 1,430 |
| 10a | do | 2,360 | 1,765 |
| 11a | do | 3,550 | 2,510 |
| 12a | do | 4,515 | 3,000 |
| 13a | do | 6,605 | 3,560 |
| 14a | do | 7,830 | 3,850 |
| 15a | do | 9,810 | 4,000 |
| 16a | do | 11,250 | 4,400 |
| 17a | Diglycerol ether obtained by reacting diglycerol with glycidyl phenyl ether mole for mole. | 1,810 | 1,510 |
| 18a | do | 2,400 | 1,805 |
| 19a | do | 3,630 | 2,730 |
| 20a | do | 4,605 | 3,100 |
| 21a | do | 6,705 | 3,580 |
| 22a | do | 7,900 | 3,880 |
| 23a | do | 9,950 | 4,080 |
| 24a | do | 11,800 | 4,630 |

The above products were comparable in physical appearance although somewhat more kerosene-soluble and less water-soluble than the corresponding ones derived from diglycerol.

PART 2

As previously pointed out the present invention is concerned with acidic esters obtained from the oxypropylated derivatives described in Part 1, immediately preceding, and polycarboxy acids, particularly dicarboxy acids such as adipic acid, phthalic acid, or anhydride, succinic acid, diglycollic acid, sebacic acid, azelaic acid, aconitic acid, maleic acid or anhydride, citraconic acid or anhydride, maleic acid or anhydride adducts as obtained by the Diels-Alder reaction from reactants such as maleic anhydride and cyclopentadiene. Such acids should be heat stable so they are not decomposed during esterification. They may contain as many as 36 carbon atoms as, for example, the acids obtained by dimerization of unsaturated fatty acids, unsaturated monocarboxy fatty acids, or unsaturated monocarboxy acids having 18 carbon atoms. Reference to the acid in the hereto appended claims obviously includes the anhydrides or any other obvious equivalents. My preference, however, is to use polycarboxy acids having not over 8 carbon atoms.

The production of esters including acid esters (fractional esters) from polycarboxy acids and glycols or other hydroxylated compounds is well known. Needless to say, various compounds may be used such as the low molal ester, the anhydride, the acyl chloride, etc. However, for purpose of economy it is customary to use either the acid or the anhydride. A conventional procedure is employed. On a laboratory scale one can employ a resin pot of the kind described in U. S. Patent No. 2,499,370, dated March 7, 1950, to De Groote and Keiser, and particularly with one more opening to permit the use of a porous spreader if hydrochloric acid gas is to be used as a catalyst. Such device or absorption spreader consists of minute alundum thimbles which are connected to a glass tube. One can add a sulfonic acid such as paratoluene sulfonic acid as a catalyst. There is some objection to this because in some instances there is some evidence that this acid catalyst tends to decompose or rearrange oxypropylated compounds, and particularly likely to do so if the esterification temperature is too high. In the case of polycarboxy acids such as diglycollic acid, which is strongly acidic there is no need to add any catalyst. The use of hydrochloric gas has one advantage over paratoluene sulfonic acid and that is that at the end of the reaction it can be removed by flushing out with nitrogen, whereas there is no reasonably convenient means available of removing the paratoluene sulfonic acid or other sulfonic acid employed. If hydrochloric acid is employed one need only pass the gas through at an exceedingly slow rate so as to keep the reaction mass acidic. Only a trace of acid need be present. I have employed hydrochloric acid gas or the aqueous acid itself to eliminate the initial basic material. My preference, however, is to use no catalyst whatsoever and to insure complete dryness of the polyglycerol as described in the final procedure just preceding Table 3.

The products obtained in Part 1 preceding may contain a basic catalyst. As a general procedure I have added an amount of half-concentrated hydrochloric acid considerably in excess of what is required to neutralize the residual catalyst. The mixture is shaken thoroughly and allowed to stand overnight. It is then filtered and refluxed with the xylene present until the water can be separated in a phase-separating trap. As soon as the product is substantially free from water the distillation stops. This preliminary step can be carried out in the flask to be used for esterification. If there is any further deposition of sodium chloride during the reflux stage needless to say a second filtration may be required. In any event the neutral or slightly acidic solution of the oxypropylated derivatives described in Part 1 is then diluted further with sufficient xylene, decalin, petroleum solvent, or the like, so that one has obtained approximately a 65% solution. To this solution there is added a polycarboxylated reactant as previously described, such as phthalic anhydride, succinic acid or anhydride, diglycollic acid, etc. The mixture is refluxed until esterification is complete as indicated by elimination of water or drop in carboxyl value. Needless to say, if one produces a halfester from an anhydride such as phthalic anhydride, no water is eliminated. However, if it is obtained from diglycollic acid, for example, water is eliminated. All such procedures are conventional and have been so thoroughly described in the literature that further consideration will be limited to a few examples and a comprehensive table.

Other precedures for eliminating the basic residual catalyst, if any, can be employed. For example, the oxyalkylation can be conducted in absence of a solvent or the solvent removed after oxypropylation. Such oxypropylation end product can then be acidified with just enough concentrated hydrochloric acid to just neutralize the residual basic catalyst. To this product one can then add a small amount of anhydrous sodium sulfate (sufficient in quantity to take up any water that is present) and then subject the mass to centrifugal force so as to eliminate the hydrated sodium sulfate and probably the sodium chloride formed. The clear somewhat viscous straw-colored amber liquid so obtained may contain a small amount of sodium sulfate or sodium chloride but, in any event, is perfectly acceptable for esterification in the manner described.

It is to be pointed out that the products here described are not polyesters in the sense that there is a plurality of polyglycerol radicals and acid radicals; the product is characterized by having only one polyglycerol radical.

In some instances and, in fact, in many instances I have found that in spite of the dehydration methods employed above that a mere trace of water still comes through and that this mere trace of water certainly interferes with the acetyl or hydroxyl value determination, at least when a number of conventional procedures are used, and may retard esterification, particularly where there is no sulfonic acid or hydrochloric acid present as a catalyst. Therefore, I have preferred to use the following procedure: I have employed about 200 grams of the polyglycerol described in Part 1, preceding; I have added about 60 grams of benzene, and then refluxed this mixture in the glass resin pot using a phase-separating trap until the benzene carried out all the water present as water of solution or the equivalent. Ordinarily this refluxing temperature is apt to be in the neighborhood of 130° to possibly 150° C. When all this water or moisture has been removed I also withdraw approximately 20 grams or a little less benzene and then add the required amount of the carboxy reactant and also about 150 grams of a high boiling aromatic petroleum solvent. These solvents are sold by various oil refineries and, as far as solvent effect act as if they were almost completely aromatic in character. Typical distillation data in the particular type I have employed and found very satisfactory is the following:

I. B. P., 142° C.  50 ml., 242° C.
5 ml., 200° C.  55 ml., 244° C.
10 ml., 209° C.  60 ml., 248° C.
15 ml., 215° C.  65 ml., 252° C.
20 ml., 216° C.  70 ml., 252° C.
25 ml., 220° C.  75 ml., 260° C.
30 ml., 225° C.  80 ml., 264° C.
35 ml., 230° C.  85 ml., 270° C.
40 ml., 234° C.  90 ml., 280° C.
45 ml. 237° C.  95 ml., 307° C.

After this material is added, refluxing is continued and, of course, is at a higher temperature,

TABLE 3

| Ex. No. of Acid Ester | Ex. No. of Hydroxy Cmpd. | Theo. Mol. W. of H. C. | Theo. Hydroxyl V. of H. C. | Actual Hydroxyl Value | Mol. Weight Based on Actual H. V. | Amt. of Hyd. Cmpd. (grs.) | Polycarboxy Reactant | Amt. of Polycarboxy Reactant (grs.) |
|---|---|---|---|---|---|---|---|---|
| 1b [1] | 1a | 1,745 | 128.5 | 154 | 1,453 | 200 | Diglycollic Acid | 73.8 |
| 2b | 1a | 1,745 | 128.5 | 154 | 1,453 | 200 | Phthalic Anhyd | 80.2 |
| 3b [1] | 1a | 1,735 | 128.5 | 154 | 1,453 | 200 | Maleic Anyhd | 54.0 |
| 4b | 1a | 1,745 | 128.5 | 154 | 1,453 | 200 | Aconitic Acid | 96.0 |
| 5b | 1a | 1,745 | 128.5 | 154 | 1,453 | 200 | Adipic Acid | 80.5 |
| 6b | 1a | 1,745 | 128.5 | 154 | 1,453 | 200 | Diglycollic Acid | 73.8 |
| 7b [1] | 1a | 1,745 | 128.5 | 154 | 1,453 | 200 | Maleic Anhyd | 54.0 |
| 8b | 1a | 1,745 | 128.5 | 154 | 1,453 | 200 | do | 54.0 |
| 9b | 2a | 2,345 | 98.4 | 131 | 1,745 | 200 | Diglycollic Acid | 61.6 |
| 10b | 2a | 2,345 | 98.4 | 131 | 1,745 | 200 | Phthalic Anhyd | 68.0 |
| 11b | 2a | 2,345 | 98.4 | 131 | 1,745 | 200 | Aconitic Acid | 80.0 |
| 12b [1] | 2a | 2,345 | 98.4 | 131 | 1,745 | 200 | Maleic Anhyd | 45.0 |
| 13b | 2a | 2,345 | 98.4 | 131 | 1,745 | 200 | Adipic Acid | 67.1 |
| 14b | 2a | 2,345 | 98.4 | 131 | 1,745 | 200 | Maleic Anhyd | 45.0 |
| 15b | 3a | 3,540 | 76.9 | 85.0 | 2,630 | 200 | Diglycollic Acid | 40.7 |
| 16b [1] | 3a | 3,540 | 76.9 | 85.0 | 2,630 | 200 | Maleic Anhyd | 29.8 |
| 17b | 3a | 3,540 | 76.9 | 85.0 | 2,630 | 200 | Phthalic Anhyd | 45.3 |
| 18b | 3a | 3,540 | 76.9 | 85.0 | 2,630 | 200 | Adipic Acid | 44.3 |
| 19b | 3a | 3,540 | 76.9 | 85.0 | 2,630 | 200 | Aconitic Acid | 52.8 |
| 20b | 3a | 3,540 | 76.9 | 85.0 | 2,630 | 200 | Maleic Anhyd | 29.8 |
| 21b | 4a | 4,485 | 50.0 | 79.7 | 2,810 | 200 | Diglycollic Acid | 38.2 |
| 22b | 4a | 4,485 | 50.0 | 79.7 | 2,810 | 200 | Phthalic Anhyd | 42.2 |
| 23b | 4a | 4,485 | 50.0 | 79.7 | 2,810 | 200 | Aconitic Acid | 49.6 |
| 24b | 4a | 4,485 | 50.0 | 79.7 | 2,810 | 200 | Maleic Anhyd | 27.9 |
| 25b | 4a | 4,485 | 50.0 | 79.7 | 2,810 | 200 | Adipic Acid | 41.7 |
| 26b | 5a | 6,585 | 34.0 | 63.1 | 3,550 | 200 | Diglycollic Acid | 30.1 |
| 27b | 5a | 6,585 | 34.0 | 63.1 | 3,550 | 200 | Phthalic Anhyd | 33.3 |
| 28b | 5a | 6,585 | 34.0 | 63.1 | 3,550 | 200 | Maleic Anhyd | 22.2 |
| 29b | 5a | 6,585 | 34.0 | 63.1 | 3,550 | 200 | Aconitic Acid | 39.2 |
| 30b | 5a | 6,585 | 34.0 | 63.1 | 3,550 | 200 | Adipic Acid | 32.8 |
| 31b | 6a | 7,765 | 28.8 | 59.6 | 3,760 | 200 | Diglycollic Acid | 28.4 |
| 32b | 6a | 7,765 | 28.8 | 59.6 | 3,760 | 200 | Phthalic Anhyd | 31.4 |
| 33b | 6a | 7,765 | 28.8 | 59.6 | 3,760 | 200 | Maleic Acid | 20.8 |
| 34b | 6a | 7,765 | 28.8 | 59.6 | 3,760 | 200 | Aconitic Acid | 36.9 |
| 35b | 6a | 7,765 | 28.8 | 59.6 | 3,760 | 200 | Adipic Anhyd | 31.0 |
| 36b | 7a | 9,665 | 23.2 | 47.3 | 3,910 | 200 | Diglycollic Acid | 30.1 |
| 37b | 7a | 9,665 | 23.2 | 47.3 | 3,910 | 200 | Maleic Anhyd | 22.1 |
| 38b | 7a | 9,665 | 23.2 | 47.3 | 3,910 | 200 | Phthalic Anhyd | 33.3 |
| 39b | 7a | 9,665 | 23.2 | 47.3 | 3,910 | 200 | Aconitic Acid | 39.0 |
| 40b | 7a | 9,665 | 23.2 | 47.3 | 3,910 | 200 | Adipic Acid | 32.8 |
| 41b | 8a | 10,900 | 20.6 | 52.4 | 4,275 | 200 | Diglycollic Acid | 25.0 |
| 42b | 8a | 10,900 | 20.6 | 52.4 | 4,275 | 200 | Phthalic Anhyd | 27.7 |
| 43b | 8a | 10,900 | 20.6 | 52.4 | 4,275 | 200 | Maleic Anhyd | 18.4 |
| 44b | 8a | 10,900 | 20.6 | 52.4 | 4,275 | 200 | Aconitic Acid | 32.6 |
| 45b | 8a | 10,900 | 20.6 | 52.4 | 4,275 | 200 | Citraconic Anhyd | 21.1 |

[1] These samples were not entirely satisfactory so were discarded and rerun, using approximately 20% less acid in each instance and approximately 10° to 20° lower temperature during esterification.

to wit, about 160° to 170° C. If the carboxy reactant is an anhydride needless to say no water of reaction appears; if the carboxy reactant is an acid water of reaction should appear and should be eliminated at the above reaction temperature. If it is not eliminated I simply separate out another 10 or 20 cc. of benzene by means of the phase-separating trap and thus raise the temperature to 180° or 190° C., or even to 200° C., if need be. My preference is not to go above about 200° C.

The use of such solvent is extremely satisfactory provided one does not attempt to remove the solvent subsequently except by vacuum distillation and provided there is no objection to a little residue. Actually, when these materials are used for a purpose such as demulsification the solvent might just as well be allowed to remain. If the solvent is to be removed by distillation, and particularly vacuum distillation, then the high boiling aromatic petroleum solvent might well be replaced by some more expensive solvent, such as decalin or an alkylated decalin which has a rather definite or close range boiling point. The removal of the solvent, of course, is purely a conventional procedure and requires no elaboration.

In the appended table solvent #7–3, which appears in numerous instances, is a mixture of 7 volumes of the aromatic petroleum solvent previously described and 3 volumes of benzene. Reference to solvent #7 means the particular petroleum solvent previously described in detail. This was used, or a similar mixture, in the manner previously described. A large number of the examples indicated employing decalin were repeated, using this mixture and particularly with the preliminary step of removing all the water. If one does not intend to remove the solvent my preference is to use the petroleum solvent-benzene mixture although obviously any of the other mixtures, such as decalin and xylene, can be employed.

The data included in the preceding and following tables, i. e., Tables 3 and 4, are self-explanatory, and very complete and it is believed no further elaboration is necessary.

TABLE 4

| Ex. No. of Acid Ester | Solvent | Amt. Solvent (grs.) | Max. Esterification Temperature °C. | Time of Esterification (Hrs.) | Water out (cc.) |
| --- | --- | --- | --- | --- | --- |
| 1b | #7 | 264 | 190 | 3 | 7.2 |
| 2b | #7 | 282 | 161 | 4 | 0.5 |
| 3b | #7 | 254 | 197 | 4½ | |
| 4b | Decalin | 287 | 204 | 5 | 13.5 |
| 5b | #7 | 271 | 245 | 5½ | 10.0 |
| 6b | #7 | 264 | 220 | 2½ | 9.4 |
| 7b | #7 | 254 | 210 | ¾ | None |
| 8b | #7 | 254 | 171 | 3 | |
| 9b | #7 | 254 | 183 | 2¾ | 7.5 |
| 10b | #7 | 269 | 210 | 11¼ | None |
| 11b | #7–3 | 272 | 224 | 6 | 7.2 |
| 12b | #7 | 246 | 151 | 4 | None |
| 13b | #7 | 268 | 212 | 8 | 8.2 |
| 14b | #7–3 | 246 | 158 | 5 | None |
| 15b | #7 | 235 | 207 | 6½ | 7.0 |
| 16b | #7–3 | 229 | 230 | 4½ | None |
| 17b | #7–3 | 243 | 142 | 4½ | None |
| 18b | #7–3 | 239 | 212 | 4½ | 3 |
| 19b | #7–3 | 247 | 194 | 2⅓ | 5.2 |
| 20b | #7–3 | 229 | 141 | 4¾ | None |
| 21b | #7–3 | 233 | 172 | 4 | 5.1 |
| 22b | #7–3 | 238 | 138 | 5¼ | None |
| 23b | #7–3 | 245 | 186 | 4½ | 4.9 |
| 24b | #7–3 | 228 | 139 | 4½ | None |
| 25b | #7–3 | 236 | 176 | 15¼ | 4.4 |
| 26b | #7–3 | 226 | 173 | 3½ | 4.0 |
| 27b | #7–3 | 233 | 167 | 5½ | None |
| 28b | #7–3 | 222 | 152 | 5½ | None |
| 29b | #7–3 | 235 | 180 | 11¼ | 4.1 |
| 30b | #7–3 | 229 | 195 | 17⅔ | 3.0 |
| 31b | #7–3 | 224 | 168 | 8¼ | 3.2 |
| 32b | #7–3 | 230 | 143 | 5½ | None |
| 33b | #7–3 | 220 | 146 | 5½ | None |
| 34b | #7–3 | 228 | 178 | 3½ | 3.8 |
| 35b | #7–3 | 227 | 190 | 17 | 3.4 |
| 36b | #7–3 | 224 | 212 | 5 | 4.6 |
| 37b | #7–3 | 220 | 151 | 5 | None |
| 38b | #7–3 | 230 | 191 | 5 | 0.2 |
| 39b | #7–3 | 232 | 202 | 3½ | 3.6 |
| 40b | #7–3 | 226 | 228 | 11½ | 3.2 |
| 41b | #7–3 | 222 | 180 | 4½ | 3.4 |
| 42b | #7–3 | 228 | 134 | 5¾ | None |
| 43b | #7–3 | 218 | 151 | 5¾ | None |
| 44b | #7–3 | 230 | 211 | 5¾ | 2.0 |
| 45b | #7–3 | 221 | 144 | 2½ | None |

The procedure for manufacturing the esters has been illustrated by preceding examples. If for any reason reaction does not take place in a manner that is acceptable, attention should be directed to the following details: (a) Recheck the hydroxyl or acetyl value of the oxypropylated polyglycerol and use a stoichiometrically equivalent amount of acid; (b) if the reaction does not proceed with reasonable speed either raise the temperature indicated or else extend the period of time up to 12 or 16 hours if need be; (c) if necessary, use ½% of paratoluene sulfonic acid or some other acid as a catalyst; (d) if the esterification does not produce a clear product a check should be made to see if an inorganic salt such as sodium chloride or sodium sulfate is not precipitating out. Such salt should be eliminated, at least for exploration experimentation, and can be removed by filtering. Everything else being equal as the size of the molecule increases the reactive hydroxyl radical represents a smaller fraction of the entire molecule and thus more difficulty is involved in obtaining complete esterification.

Even under the most carefully controlled conditions of oxypropylation involving comparatively low temperatures and long time of reaction there are formed certain compounds whose composition is still obscure. Such side reaction products can contribute a substantial proportion of the final cogeneric reaction mixture. Various suggestions have been made as to the nature of these compounds, such as being cyclic polymers of propylene oxide, dehydration products with the appearance of a vinyl radical, or isomers of propylene oxide or derivatives thereof, i. e., of an aldehyde, ketone, or allyl alcohol. In some instances an attempt to react the stoichiometric amount of a polycarboxy acid with the oxypropylated derivative results in an excess of the carboxylated reactant for the reason that apparently under conditions of reaction less reactive hydroxyl radicals are present than indicated by the hydroxyl value. Under such circumstances there is simply a residue of the carboxylic reactant which can be removed by filtration or, if desired, the esterification procedure can be repeated using an appropriately reduced ratio of carboxylic reactant.

Even the determination of the hydroxyl value and conventional procedure leaves much to be desired due either to the cogeneric materials previously referred to, or for that matter, the presence of any inorganic salts or propylene oxide. Obviously this oxide should be eliminated.

The solvent employed, if any, can be removed from the finished ester by distillation and particularly vacuum distillation. The intermediate products or liquids prior to esterification are generally pale amber to amber in color, and show moderate viscosity. They can be bleached with bleaching clays, filtering chars, and the like. However, for the purpose of demulsification or the like color is not a factor and decolorization is not justified.

In the above instance I have permitted the solvents to remain present in the final reaction mass. In other instances I have followed the same procedure using decalin or a mixture of decalin or benzene in the same manner and ultimately removed all the solvents by vacuum distillation. Appearances of the final products after esterification are much the same as the polyglycerols before esterification and in some instances were somewhat darker in color and had a reddish cast and perhaps somewhat more viscous.

PART 3

In the hereto appended claims the demulsifying agent is described as an ester obtained from a polyhydroxylated material having at least four hydroxyls. If one were concerned with a monohydroxylated material or a dihydroxylated material one might be able to write a formula which in essence would represent the particular product. However, in a more highly hydroxylated material the problem becomes increasingly more difficult for reasons which have already been indicated in connection with oxypropylation and which can be examined by merely considering for the moment a monohydroxylated material.

Oxypropylation involves the same sort of variations as appear in preparing high molal polypropylene glycols. Propylene glycol has a secondary alcoholic radical and a primary alcohol radical. Obviously then polypropylene glycols could be obtained, at least theoretically, in which two secondary alcoholic groups are united or a secondary alcohol group is united to a primary alcohol group, etherization being involved, of course, in each instance. Needless to say, the same situation applies when one has oxypropylated and polyhydric materials having 4 or more hydroxyls.

Usually no effort is made to differentiate between oxypropylation taking place, for example, at the primary alcohol unit radical or the secondary alcohol radical. Actually, when such products are obtained, such as a high molal polypropylene glycol or the products obtained in the manner herein described one does not obtain a single derivative such as $HO(RO)_nH$ or $—(RO)_nH$ in which $n$ has one and only one value, for instance, 14, 15 or 16, or the like. Rather, one obtains a cogeneric mixture of closely related or touching homologues. These materials invariable have high molecular weights and cannot be separated from one another by any known procedure without decomposition. The properties of such mixture represent the contribution of the various indviduial members of the mixture. On a statistical basis, of course, $n$ can be appropriately specified. For practical purposes one need only consider the oxypropylation of a monohydric alcohol because in essence this is substantially the mechanism involved. Even in such instances where one is concerned with a monohydric reactant one cannot draw a single formula and say that by following such procedure one can readily obtain 80% or 90% or 100% of such compound. However, in the case of at least monohydric initial reactants one can readily draw the formulas of a large number of compounds which appear in some of the probable mixtures or can be prepared as components and mixtures which are manufactured conventionally.

Simply by way of illustration reference is made to the De Groote, Wirtel and Pettingill Patent No. 2,549,434, dated April 17, 1951, the application for which was copending with my copending application Serial No. 179,401 noted above.

However, momentarily referring again to a monohydric initial reactant it is obvious that if one selects any such simple hydroxylated compound and subjects such compound to oxyalkylation, such as oxyethylation, or oxypropylation, it becomes obvious that one is really producing a polymer of the alkylene oxides except for the terminal group. This is particularly true where the amount of oxide added is comparatively large, for instance, 10, 20, 30, 40, or 50 units. If such compound is subjected to oxyethylation so as to introduce 30 units of ethylene oxide, it is well known that one does not obtain a single constituent which, for the sake of convenience, may be indicated as $RO(C_2H_4O)_{30}H$. Instead, one obtains a cogeneric mixture of closely related homologues, in which the formula may be shown as the following, $RO(C_2H_4O)_nH$, wherein $n$, as far as the statistical average goes, is 30, but the individual members present in significant amount may vary from instances where $n$ has a value of 25, and perhaps less, to a point where $n$ may represent 35 or more. Such mixture is, as stated, a cogeneric closely related series of touching homologous compounds. Considerable investigation has been made in regard to the distribution curves for linear polymers. Attention is directed to the article entitled "Fundamental principles of condensation polymerization," by Flory, which appeared in Chemical Reviews, volume 39, No. 1, page 137.

Unfortunately, as has been pointed out by Flory and other investigators, there is no satisfactory method, based on either experimental or mathematical examination, of indicating the exact proportion of the various members of touching homologous series which appear in cogeneric condensation products of the kind described. This means that from the practical standpoint, i. e., the ability to describe how to make the product under consideration and how to repeat such production time after time without difficulty, it is necessary to resort to some other method of description, or else consider the value of $n$, in formulas such as those which have appeared previously as representing both individual constituents in which $n$ has a single definite value, and also with the understanding that $n$ represents the average statistical value based on the assumption of completeness of reaction.

This may be illustrated as follows: Assume that in any particular example the molal ratio of propylene oxide per hydroxyl is 15 to 1. In a generic formula 15 to 1 could be 10, 20, or some other amount and indicated by $n$. Referring to this specific case actually one obtains products in which $n$ probably varies from 10 to 20, perhaps even further. The average value, however, is 15, assuming, as previously stated, that the reaction is complete. The product described by the formula is best described also in terms of method of manufacture.

The significant fact in regard to the oxypropylated polyglycerols and the ethers thereof, and particularly those obtained from acyclic diglycerol, is that although the initial products are all water-soluble in a theoretical molecular weight range in excess of 2,000 depending in part whether the initial product is etherized or not and the size of the etherized radical, one obtains water-insolubility. The product may tend to emulsify or disperse somewhat because some of the constituents, being a cogeneric mixture, are water-soluble but the bulk are insoluble. Thus one gets emulsifiability or dispersibility as noted. Such products are invariably xylene-soluble regardless of whether the original reactants were or not. In numerous instances usually at a theoretical molecular weight range of approximately twice the above, i. e., about 4,000, not only is the product substantially water-insoluble but it is kerosene-soluble. I have found these kerosene-soluble oxyalkylation products are most desirable for preparing the esters. I have prepared hydroxylated derivatives not only up to the theoretical molecular weights shown but also up to twice this value, i. e., approximately 25,000. Some of these were prepared from triglycerol, tetraglycerol and pentaglycerol. These in turn were prepared from glycerol or diglycerol and glycide. The exact composition is open to question insofar that it is approximately a mixture of polyglycerol plus an extremely small amount of initial reactant present. The reasons are obvious because the same conditions are maintained in oxyalkylation with glycide as with oxide. It is interesting to note, however, that the molecular weights based on hydroxyl determinations at this point were considerably less, in the neighborhood of one-third or one-fourth this value, i. e., 6,000 to 7,000, and in a few instances, 8,000. It becomes obvious when polycarboxylic esters are prepared from such high molecular weight materials there cannot be more terminal hydroxyls than were present initially, for instance, 4, 5, 6, 7, 8 or possibly 10 or 12. Likewise, the contribution to the total molecular weight made by the polycarboxy acid is small. By the same token one would expect the effectiveness of the demulsifier to be comparable to the unesterified hydroxylated material. Remarkably enough, in many instances the product was distinctly better. This is true, also, of certain other derivatives referred to in my aforementioned Patent No. 2,552,528, and is true, also, in regard to what is said subsequently in Part 5.

PART 4

Conventional demulsifying agents employed in the treatment of oil field emulsions are used as such, or after dilution with any suitable solvent, such as water, petroleum hydrocarbons, such as benzene, toluene, xylene, tar acid oil, cresol, anthracene oil, etc. Alcohols, particularly aliphatic alcohols, such as methyl alcohol, ethyl alcohol, denatured alcohol, propyl alcohol, butyl alcohol, hexyl alcohol, octyl alcohol, etc., may be employed as diluents. Miscellaneous solvents such as pine oil, carbon tetrachloride, sulfur dioxide extract obtained in the refining of petroleum, etc., may be employed as diluents. Similarly, the material or materials employed as the demulsifying agent of my process may be admixed with one or more of the solvents customarily used in connection with conventional demulsifying agents. Moreover, said material or materials may be used along or in admixture with other suitable well-known classes of demulsifying agents.

It is well known that conventional demulsifying agents may be used in a water-soluble form, or in an oil-soluble form, or in a form exhibiting both oil- and water-solubility. Sometimes they may be used in a form which exhibits relatively limited oil-solubility. However, since such reagents are frequently used in a ratio of 1 to 10,000 or 1 to 20,000, or 1 to 30,000, or even 1 to 40,000, or 1 to 50,000 as in desalting practice, such an apparent insolubility in oil and water is not significant because said reagents undoubtedly have solubility within such concentrations. This same fact is true in regard to the material or materials employed as the demulsifying agent of my process.

In practicing my process for resolving petroleum emulsions of the water-in-oil type, a treating agent or demulsifying agent of the kind above described is brought into contact with or caused to act upon the emulsion to be treated, in any of the various apparatus now generally used to resolve or break petroleum emulsions with a chemical reagent, the above procedure being used alone or in combination with other demulsifying procedure, such as the electrical dehydration process.

One type of procedure is to accumulate a volume of emulsified oil in a tank and conduct a batch treatment type of demulsification procedure to recover clean oil. In this procedure the emulsion is admixed with the demulsifier, for example by agitating the tank of emulsion and slowly dripping demulsifier into the emulsion. In some cases mixing is achieved by heating the emulsion while dripping in the demulsifier, depending upon the convection currents in the emulsion to produce satisfactory admixture. In a third modification of this type of treatment, a circulating pump withdraws emulsion from, e. g., the bottom of the tank, and reintroduces it into the top of the tank, the demulsifier being added, for example, at the suction side of said circulating pump.

In a second type of treating procedure, the demulsifier is introduced into the well fluids at the well-head or at some point between the well-head and the final oil storage tank, by means of an adjustable proportioning mechanism or proportioning pump. Ordinarily the flow of fluids through the subsequent lines and fittings suffices to produce the desired degree of mixing of demulsifier and emulsion, although in some instances additional mixing devices may be introduced into the flow system. In this general procedure, the system may include various mechanical devices for withdrawing free water, separating entrained water, or accomplishing quiescent settling of the chemicalized emulsion. Heating devices may likewise be incorporated in any of the treating procedures described herein.

A third type of application (down-the-hole) of demulsifier to emulsion is to introduce the demulsifier either periodically or continuously in diluted or undiluted form into the well and to allow it to come to the surface with the well fluids, and then to flow the chemicalized emulsion through any desirable surface equipment, such as employed in the other treating procedures. This particular type of application is decidedly useful when the demulsifier is used in connection with acidification of calcareous oil-bearing strata, especially if suspended in or dissolved in the acid employed for acidification.

In all cases, it will be apparent from the foregoing description, the broad process consists simply in introducing a relatively small proportion of demulsifier into a relatively large proportion of emulsion, admixing the chemical and emulsion either through natural flow or through special apparatus, with or without the application of heat, and allowing the mixture to stand quiescent until the undesirable water content of the emulsion separates and settles from the mass.

The following is a typical installation.

A reservoir to hold the demulsifier of the kind described (diluted or undiluted) is placed at the well-head where the effluent liquids leave the well. This reservoir or container, which may vary from 5 gallons to 50 gallons for convenience, is connected to a proportioning pump which injects the demulsifier drop-wise into the fluids leaving the well. Such chemicalized fluids pass through the flowline into a settling tank. The settling tank consists of a tank of any convenient size, for instance, one which will hold amounts of fluid produced in 4 to 24 hours (500 barrels' to 2000 barrels' capacity), and in which there is a perpendicular conduit from the top of the tank to almost the very bottom so as to permit the incoming fluids to pass from the top of the settling tank to the bottom, so that such incoming fluids do not disturb stratification which takes place during the course of demulsification. The settling tank has two outlets, one being below the water level to drain off the water resulting from demulsification or accompanying the emulsion as free water, the other being an oil outlet at the top to permit the passage of dehydrated oil to a second tank, being a storage tank, which holds pipeline or dehydrated oil. If desired, the conduit or pipe which serves to carry the fluids from the well to the settling tank may include a section of pipe with baffles to serve as a mixer, to insure thorough distribution of the demulsifier throughout the fluids, or a heater for raising the temperature of the fluids to some convenient temperature, for instance, 120° to 160° F., or both heater and mixer.

Demulsification procedure is started by simply setting the pump so as to feed a comparatively large ratio of demulsifier, for instance, 1:5,000. As soon as a complete "break" or satisfactory demulsification is obtained, the pump is regulated until experience shows that the amount of demulsifier being added is just sufficient to produce clean or dehydrated oil. The amount being fed at such stage is usually 1:10,000, 1:15,000, 1:20,000, or the like.

In many instances the oxyalklated products herein specified as demulsifiers can be conveniently used without dilution. However, as previously noted, they may be diluted as desired with any suitable solvent. For instance, by mixing 75 parts by weight of an oxyalkylated derivative, for example, the product of Example 31b with 15 parts by weight of xylene and 10 parts by weight of isopropyl alcohol, an excellent demulsifier is obtained. Selection of the solvent will vary, depending upon the solubility characteristics of the oxyalkylated product, and of course will be dictated in part by economic considerations, i. e., cost.

As noted above, the products herein described may be used not only in diluted form, but also may be used admixed with some other chemical demulsifier. A mixture which illustrates such combination is the following:

Oxyalkylated derivative, for example, the product of Example 31b, 20%;

A cyclohexylamine salt of a polypropylated naphthalene mono-sulfonic acid, 24%;

An ammonium salt of a polypropylated naphthalene mono-sulfonic acid, 24%;

A sodium salt of oil-solube mahogany petroleum sulfonic acid, 12%;

A high-boiling aromatic petroleum solvent, 15%;

Isopropyl alcohol, 5%.

The above proportions are all weight percents.

PART 5

Previous reference has been made to other oxyalkylating agents other than propylene oxide, such as ethylene oxide. Obviously variants can be prepared which do not depart from what is said herein but do produce modifications. The polyhydroxylated compounds employed as intermediates can be reacted with ethylene oxide in modest amounts and then subjected to oxypropylation provided the resultant derivative is (a) comparatively water-insoluble as previously noted or at least beyond 2,000 on the theoretical weight basis previously noted and is preferably kerosene-soluble and in any event xylene-soluble and has from 7 to 80 alkylene oxide radicals per initial hydroxyl radical. Needless to say, in order to have water-insolubility and kerosene-solubility the large majority must be propylene oxide. Other variants suggest themselves as, for example, replacing propylene oxide by butylene oxide.

Needless to say the, one mole of diglycerol, triglycerol, or a similar polyglycerol or ether thereof can be treated with a small amount of ethylene oxide and then treated with propylene oxide so as to produce preferably the water-insoluble, kerosene-soluble derivative having 7 to 80 oxide radicals per initial hydroxyl as previously indicated. Similarly the propylene oxide can be added first and then the ethylene oxide, or random oxyalkylation can be employed using a mixture of the two oxides. The compounds so obtained are readily esterified in the same manner as described in Part 2, preceding. Incidentally, the polyhydroxylated compounds described in Part 1 or the modifications described therein can be treated with various reactants such as glycide, epichlorohydrin, dimethyl sulfate, sulfuric acid, maleic anhydride, ethylene imine, etc. If treated with epichlorohydrin or monochloroacetic acid the resultant product can be further reacted with a tertiary amine such as pyridine, or the like, to give quaternary ammonium compounds. If treated with maleic anhydride to give a total ester the resultant can be treated with sodium bisulfite to yield a sulfosuccinate. Sulfo groups can be introduced also by means of a sulfating agent as previously suggested, or by treating the chloroacetic acid resultant with sodium sulfite.

I have found that if such hydroxylated compound or compounds are reacted further so as to produce entirely new derivatives, such new derivatives have the properties of the original hydroxylated compound insofar that they are effective and valuable demulsifying agents for resolution of water-in-oil emulsions as found in the petroleum industry, as break inducers in doctor treatment of sour crude, etc.

Having thus described my invention what I claim as new and desire to secure by Letters Patent is:

1. A process for breaking petroleum emulsions of the water-in-oil type characterized by subjecting the emulsion to the action of a demulsifier including hydrophile synthetic products; said hydrophile synthetic products being the acidic fractional esters derived by reaction between (A) a polycarboxy acid and (B) high molal oxypropylation derivatives of polyglycerols and ethers of polyglycerols, with the proviso that (a) the initial polyhydric reactant have at least 4 hydroxyl radicals; (b) the initial polyhydric reactant be free from any radical having at least 8 uninterrupted carbon atoms; (c) the initial polyhydric reactant be water-soluble; (d) the oxypropylation end product be water-insoluble; (e) the oxypropylation end product be within the molecular weight range of 2,000 to 25,000 on an average statistical basis; (f) the solubility characteristics of the oxypropylation end product in respect to water and organic solvents be substantially the result of the oxypropylation step; (g) the ratio of propylene oxide per hydroxyl in the original polyhydric reactant be within the range of 7 to 80; (h) the initial polyglycerol reactant represent not more than 12½% by weight of the oxypropylation end product on a statistical basis; and (i) the preceding provisos being based on complete reaction involving the propylene oxide and the initial polyhydric reactant; and (C) with the final proviso that the reaction ratio of (A) to (B) be one mole of (A) for each hydroxyl radical present in (B).

2. A process for breaking petroleum emulsions of the water-in-oil type characterized by subjecting the emulsion to the action of a demulsifier including hydrophile synthetic products; said hydrophile synthetic products being the acidic fractional esters derived by reaction between (A) a polycarboxy acid and (B) high molal oxypropylation derivatives of polyglycerols, with the proviso that (a) the initial polyhydric reactant have at least 4 hydroxyl radicals; (b) the initial polyhydric reactant be free from any radical having at least 8 uninterrupted carbon atoms; (c) the initial polyhydric reactant be water-soluble; (d) the oxypropylation end product be water-insoluble; (e) the oxypropylation end product be within the molecular weight range of 2,000 to 25,000 on an average statistical basis; (f) the solubility characteristics of the oxypropylation end product in respect to water and organic solvents be substantially the result of the oxypropylation step; (g) the ratio of propylene oxide per hydroxyl in the original polyhydric reactant be within the range of 7 to 80; (h) the initial polyglycerol reactant represent not more than 12½% by weight of the oxypropylation end product on a statistical basis; and (i) the preceding provisos being based on complete reaction involving the propylene oxide and the initial polyhydric reactant; and (C) with the final proviso that the reaction ratio of (A) to (B) be one mole of (A) for each hydroxyl radical present in (B).

3. The process of claim 2 with the proviso that the oxypropylation product prior to esterification be xylene-soluble.

4. The process of claim 2 with the proviso that the oxypropylation product prior to esterification be soluble in both xylene and kerosene.

5. A process for breaking petroleum emulsions of the water-in-oil type characterized by subjecting the emulsion to the action of a demulsifier including hydrophile synthetic products; said hydrophile synthetic products being the acidic fractional esters derived by reaction between (A) a polycarboxy acid and (B) high molal oxypropylation derivatives of acyclic diglycerol with the proviso that (a) the oxypropylation end product be water-insoluble; (b) the oxypropylation end product be within the molecular weight range of 2,000 to 25,000 on an average statistical basis; (c) the oxypropylation end product be soluble in xylene and kerosene; (d) the solubility characteristics of the oxypropylation end product in respect to water and organic solvents be substantially the result of the oxypropylation step; (e) the ratio of propylene oxide per hydroxyl in the original diglycerol be within the range of 7 to 80; (f) the initial diglycerol represent not more than 12½% by weight of the oxypropylation end product on a statistical basis; (g) the preceding provisos being based on complete reaction involving the propylene oxide and the initial polyhydric reactant; and (C) with the final proviso that the reaction ratio of (A) to (B) be one mole of (A) for each hydroxyl radical present in (B).

6. The process of claim 5 with the proviso that the theoretical molecular weight be within the range of 2,000 to 10,000.

7. The process of claim 5 with the proviso that the theoretical molecular weight be within the range of 2,000 to 10,000 and that the polycarboxy acid be dicarboxy acid.

8. The process of claim 5 with the proviso that the theoretical molecular weight be within the range of 2,000 to 10,000 and that the polycarboxy acid be phthalic acid.

9. The process of claim 5 with the proviso that the theoretical molecular weight be within the range of 2,000 to 10,000 and that the polycarboxy acid be maleic acid.

10. The process of claim 5 with the proviso that the theoretical molecular weight be within the range of 2,000 to 10,000 and that the polycarboxy acid be succinic acid.

11. The process of claim 5 with the proviso that the theoretical molecular weight be within the range of 2,000 to 10,000 and that the polycarboxy acid be citraconic acid.

12. The process of claim 5 with the proviso that the theoretical molecular weight be within the range of 2,000 to 10,000 and that the polycarboxy acid be diglycolic acid.

MELVIN DE GROOTE.

REFERENCES CITED

The following references are of record in the file of this patent:

UNITED STATES PATENTS

| Number | Name | Date |
|---|---|---|
| 2,507,560 | De Groote et al. | May 16, 1950 |
| 2,514,399 | Kirkpatrick et al. | July 11, 1950 |
| 2,562,878 | Blair | Aug. 7, 1951 |